United States Patent [19]  [11] 3,894,903
Brooks et al.  [45] July 15, 1975

[54] PROCESS OF BONDING RUBBER TO COPPER EMPLOYING A TRIAZINE COMPOUND

[75] Inventors: John Langshaw Brooks; David Crawford Eaton; Peter Laithwaite, all of Manchester, England

[73] Assignee: Imperial Chemical Industries Limited, London, England

[22] Filed: Sept. 23, 1974

[21] Appl. No.: 508,711

Related U.S. Application Data

[63] Continuation of Ser. No. 346,792, April 2, 1973, abandoned.

[30] Foreign Application Priority Data

Apr. 11, 1972 United Kingdom............... 16606/72

[52] U.S. Cl. ............ 156/306; 117/128.7; 117/133; 161/217; 161/221; 260/248 R
[51] Int. Cl............................ B29h 9/00; B44d 1/42
[58] Field of Search ........... 156/306, 308, 309, 110, 156/110 MD, 334, 124; 260/791, 748 R, 748 CS, 768, 775; 161/221, 222, 217; 117/128.7, 133, 79, 132 CB

[56] References Cited
UNITED STATES PATENTS

| | | |
|---|---|---|
| 2,510,503 | 6/1950 | Kropa............................ 156/110 MD |
| 2,900,292 | 8/1959 | Coleman, Jr. et al. ............. 161/218 |
| 3,250,772 | 3/1966 | Denten et al. ...................... 260/791 |
| 3,258,388 | 6/1966 | Coleman, Jr. et al. ............. 161/221 |
| 3,366,598 | 1/1968 | Nestinning et al............ 260/248 CS |
| 3,728,192 | 4/1973 | Kindle et al. ........................ 156/124 |

*Primary Examiner*—Charles E. Van Horn
*Assistant Examiner*—Michael W. Ball
*Attorney, Agent, or Firm*—Cushman, Darby & Cushman

[57] ABSTRACT

The bonding of rubber to copper and copper alloys is improved by incorporating into the rubber before vulcanisation a s-triazine carrying at the 2- position a hydroxyphenoxy, hydroxyanilino or hydroxyphenylmercapto group and optionally in each of the 4 and 6 positions a similar group or a hydroxy or chloro group or an optionally substituted amino or mercapto group. The strongest bonds are obtained by the use of 2-m-hydroxyphenoxy-4-chloro-6-aminotriazines.

3 Claims, No Drawings

PROCESS OF BONDING RUBBER TO COPPER EMPLOYING A TRIAZINE COMPOUND

This is a continuation, of application Ser. No. 346,792 filed Apr. 2, 1973, now abandoned.

This invention relates to the bonding of rubber to copper and alloys thereof and more particularly to the use of certain phenolic triazine compounds to obtain improved adhesion.

Composite articles in which rubber is bonded to copper and alloys thereof are useful for many purposes. For example tyres, hoses and belts of rubber are frequently reinforced with brass-coated steel cord. It is customary to use additives in the rubber which improve the strength of the bond but such additives, examples of which are formaldehyde generators in the presence of resorcinol, can cause undesirable effects such as a decrease in the scorch safety of the mix, alteration of cure rate, and fuming at high temperatures. Furthermore these additives may lead to skin irritation. The present invention relates to additives which can be used alone in the rubber and are not objectionable ingredients and provide a considerable increase in bond strength.

According to the invention there is provided a method of bonding a rubber to copper or alloys thereof which comprises adding to a vulcanisable rubber composition a triazine compound of the formula

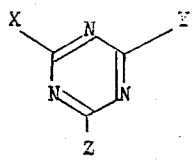

wherein X is a group containing a phenolic hydroxyl group and derived by loss of one hydrogen atom from a dihydroxybenzene, aminophenol or mercaptophenol any of which may contain as substituent a chlorine or bromine atom, an alkyl or alkoxy group containing from 1 to 4 carbon atoms or another hydroxyl or amino group, and Y and Z, which may be the same or different, may be a group of the type represented by X or a hydrogen or chlorine atom or a hydroxy, amino or mercapto group in which the hydrogen atom or atoms may optionally be substituted by an alkyl group containing from 1 to 12 carbon atoms, a cycloalkyl group, an alkenyl group containing from 3 to 12 carbon atoms; a phenyl group optionally substituted by a chlorine atom or alkyl or alkoxy group containing from 1 to 4 carbon atoms, or in the case where Y and/or Z represents a substituted amino group such substituent may take the form of a divalent saturated radical forming a five or six-membered ring with the nitrogen atom, and bringing the vulcanisable rubber composition into contact with the copper or alloy thereof, and heating the composite article to vulcanise the rubber.

The rubber may be natural rubber or a vulcanisable synthetic rubber such as polymers including cis-polymers of butadiene and isoprene, polychlorobutadiene, and copolymers of dienes such as butadiene and isoprene with polymerisable compounds such as styrene, isobutene, acrylonitrile, and methyl methacrylate and terpolymers such as ethylene/propylene/diolefin, and blends of these rubbers.

The invention is of particular value in promoting bonding of rubber to brass-coated steel cords since these are used to reinforce tires and without a bonding agent they do not adhere strongly to the rubber. The invention is however also of use in promoting bonding to other copper articles and articles of copper alloys such as engine mountings, shock absorbers, plant linings and metal reinforced hose.

As groups which may be represented by X there may be mentioned especially 3-hydroxyphenoxy groups and nuclear-substituted derivatives, such as 3-hydroxyphenoxy, 3,5-dihydroxyphenoxy, 4-chloro-3-hydroxyphenoxy, 4-bromo-3-hydroxyphenoxy, 2- and 4-methyl-3-hydroxyphenoxy, 3,4-dihydroxyphenoxy, 5-methoxy-3-hydroxyphenoxy, 2-, 3- and 4-hydroxyanilino, 2- and 4- hydroxyphenoxy, and 2-, 3- and 4- hydroxyphenylthio.

As groups which may replace the hydrogen atom or atoms in the hydroxy, amino or mercapto groups which may be represented by Y or Z, there may be mentioned alkyl groups such as methyl, ethyl, isopropyl, sec.-butyl, n-hexyl, dodecyl and tert.-octyl, cycloalkyl groups such as cyclohexyl, alkenyl groups such as allyl and but-2-enyl, optionally substituted phenyl groups such as 2-, 3-, and 4-chlorophenyl, 3,4-dichlorophenyl, 2-, 3-, and 4-methylphenyl, 4-methoxyphenyl, 4-butylphenyl and 2-chloro-4-methylphenyl, and divalent saturated groups which together with the nitrogen atom will form a piperidino or morpholino group.

Examples of suitable triazine compounds are 2-amino-4-chloro-6-(3'-hydroxyphenoxy)triazine, 2-methylamino-4-chloro-6-(3'-hydroxyphenoxy)triazine and 2-amino-4-chloro-6(3', 5'-dihydroxyphenoxy)triazine.

The preferred triazine compounds which in general provide especially high bond strengths, are those in which X is an optionally substituted m-hydroxyphenoxy or a m-hydroxyanilino group, and Y and Z, which may be the same or different, are each a group X or an amino, methylamino or chloro group, and especially those in which X is a m-hydroxyphenoxy group optionally containing a further hydroxyl group, Y is a chlorine atom and Z an amino group. These preferred triazine compounds are new compounds and represent a further feature of the invention.

The triazine compound should be used in amount at least 0.1%, and preferably between 1 and 5%, of the weight of rubber. It is not necessary that the triazine compound should be distributed throughout the rubber but only that it should be present in adequate amount in the region of the rubber/metal interface. Thus comparatively small amounts of a rubber containing the triazine compound may be used as a bonding agent at the point of contact between metal and a rubber free from triazine compound.

Vulcanisation may be carried out by heating the composite article to a temperature conventionally used for vulcanising the vulcanisable rubber composite concerned. The vulcanisable rubber composition will normally contain a vulcanising agent such as sulphur or a sulphur donor for example N,N'-dithio-bis (hexahydro-2H-azepinone-3), 4,4'-dithiomorpholine or bis-(diethyl) thiophosphoryl)trisulphide and a vulcanisation accelerator for example benzothiazylsulphenamides such as benzothiazyl-2-cyclohexyl sulphenamide, 2-(morpholinothio)benzothiazole, benzothiazyl-2-dicyclohexylsulphenamide, and N-t-butyl-2-benzothiazolesulphenamide, 2-mercaptobenzothiazole, 2-mercaptobenzothiazyl-disulphide, diarylguanidines, thiurams and dithiocarbamates.

The vulcanisable rubber composition may if desired contain other conventional rubber adjuvants such as antioxidants, antiozonants, fillers, reinforcing agents, pigments, processing oils and accelerator activators such as zinc oxide and stearic acid and also ingredients used in other bonding systems such as formaldehyde generators.

The preferred triazine compounds may be prepared by any of the well-known conventional methods for replacing the chlorine atoms in triazinyl chloride with a group X and one or two of the groups Y and Z. For example triazinyl chloride may be reacted in any order with the required molar proportions of a compound XH and, as necessary, compounds YH and ZH, whenever XH is an optionally substituted m-hydroxyphenol or m-hydroxyaniline, and YH and ZH are either a group XH or ammonia, or methylamine, in presence of acid binding agents at progressively higher temperatures.

The invention is illustrated but not limited by the following Examples in which all parts and percentages are by weight unless otherwise stated.

EXAMPLE 1

A vulcanisable rubber composition was prepared on a two roll mill from the following ingredients.

| | |
|---|---|
| Natural rubber smoked sheets | 100 |
| Zinc oxide | 10 |
| Stearic acid | 3 |
| High Abrasion Furnace Carbon Black | 45 |
| Processing oil | 4 |
| N-dicyclohexyl-2-benzothiazyl sulphenamide | 0.7 |
| Sulphur | 4 |
| Antioxidant (acetone/diphenylamine condensate) | 1 |
| Bonding agent | as in Table 1 |

Samples measuring approximately 1¼ inches × 7/16 inches × 7.3 mm were taken from the above composition and a length of brass-coated steel cord was sandwiched between two of the samples.

The resultant sandwich was placed in a mould, and press cured for 30 minutes at 150°C. After removal from the mould the resultant block, which measured 1¼ inch × ½% × ½inch, was cut into two across the cord and the force required to pull the chord out of the rubber measured.

Table 1

| | | |
|---|---|---|
| Rubber in composition | 167.7 | 167.7 |
| 2-chloro-4-amino-6-m-hydroxyphenoxy-s-triazine | — | 3.0 |
| Force (Kg) required to pull cord from 1¼" long block | 46 | 57 |

The 2-amino-4-chloro-6-m-hydroxyphenoxy-s-triazine used above was prepared as follows:-

An aqueous suspension of cyanuric chloride was prepared by dissolving 369 parts of cyanuric chloride in 1100 parts of acetone, filtering to remove a trace of insoluble matter, and adding the solution to a mixture of 500 parts of ice and 500 parts of water. The suspension is stirred at 0–5°C while a solution of 160 parts of sodium hydroxide in 500 parts of water and a mixture of 119 parts of aqueous ammonia (specific gravity 0.88) and 38 parts of water are each added over 30 minutes. After stirring for a further 30 minutes at 0–5°C the temperature was raised to 25°C and a solution of 220 parts of resorcinol and 80 parts of sodium hydroxide in 500 parts of water was added with stirring over 20 minutes. The suspension was then stirred at 25°C for 30 minutes, at 35°C for 1 hour, cooled to 15° C, and the insoluble product collected by filtration, washed with water until chloride free, and dried at room temperature under reduced pressure. The product was a white powder, with no clearly defined melting point owing to decomposition, analysing for nitrogen, 22.4% and chlorine 14.7% ($C_9H_7ClN_4O_2$ requires nitrogen, 23.5% and chlorine 14.9%).

EXAMPLE 2

Vulcanisable rubber compositions were prepared and bonded to brass-coated steel cord by the procedure described in Example 1 using the bonding agents listed below and the force required to pull the chord from the rubber measured. The results obtained and comparative results for bonds obtained without use of the bonding agents are as follows:

| Bonding Agent | Force required to remove cord (kg.) | |
|---|---|---|
| | without bonding agent | with bonding agent |
| 2-Chloro-4-allylamino-6-m-hydroxyphenoxy-s-triazine (3 parts) | 44 | 51 |
| 2-Chloro-4-amino-6-(3',5'-dihydroxyphenoxy)-5-triazine (3 parts) | 40 | 44 |
| 2-Chloro-4-methylamino-6-m-hydroxyphenoxy-s-triazine (3 parts) | 40 | 46 |
| 2-Chloro-4-amino-6-p-hydroxyphenoxy-s-triazine (3 parts) | 40 | 44 |
| 2-chloro-4-amino-6-(2'-methyl-3'-hydroxyphenoxy)-s-triazine (2 parts) | 45 | 47 |
| 2-Chloro-4-amino-6-(m-hydroxyphenylmercapto)-s-triazine (2 parts) | 45 | 52 |
| 2-Chloro-4-amino-6-(2',3'-dihydroxyphenoxy)-s-triazine (2 parts) | 45 | 56 |

The bonding agents used above were prepared by the general procedure described in Example 1 using similar molar proportions of reagents. The products were all white powders of indefinite melting point. Analyses were 2-chloro-4-allylamino-6-m-hydroxyphenoxy-s-triazine, found nitrogen 20.1%, chlorine 12.7%, $C_{12}H_{11}ClN_4O_2$ requires nitrogen, 22.7% chlorine 12.8%, 2-chloro-4amino-6-(3',5'-dihydroxyphenoxy)-s-triazine, found nitrogen 24.0%, chlorine 14.4%, $C_9H_7ClN_4O_3$ requires nitrogen 22.0%, chlorine 13.9%, 2-chloro-4-methylamino-6-m-hydroxyphenoxy-s-triazine, found nitrogen 26.2%, chlorine 16.7%, $C_{10}H_9ClN_4O_2$ requires nitrogen, 22.2%; chlorine 14%, 2-chloro-4-amino-6-p-hydroxyphenoxy-s-triazine, found nitrogen 26.5%, chlorine 13.2%, $C_9H_7Cl_4O_2$ requires nitrogen 23.5%; chlorine 14.9% 2-chloro-4-amino-6-(2'-methyl-3'-hydroxyphenoxy)-s-triazine, found nitrogen 21.7%, chlorine 13.7%, $C_{10}H_9ClN_4O_2$ requires nitrogen 22.1% chlorine 14.5% and 2-chloro-4-amino-6-(2',3'-dihydroxyphenoxy)-s-triazine, found nitrogen 22.2%, chlorine 14.1%. $C_9H_7ClN_4O_3$ requires Nitrogen 22.2; chlorine 14.5%.

EXAMPLE 3

Vulcanisation rubber compositions were prepared on a two roll mill from the following ingredients:

| | |
|---|---|
| Natural rubber smoked sheets | 100 |
| Zinc oxide | 10 |
| Stearic acid | 3 |
| High Abrasion Furnace Carbon Black | 65 |
| Processing oil | 4 |
| N-Morpholyl-2-benzthiazylsulphenamide | 2.5 |
| Sulphur | 1.5 |
| Antioxidant (acetone/diphenylamine condensate) | 1 |
| Bonding agent | 3 |
| | 1 |

The compositions were bonded to brass-coated steel cord and vulcanised, and the force required to pull the cord out of the rubber measured as described in Example 1. The results obtained and the comparative results for bonds obtained without use of the bonding agent were as follows:

| | Without Agent | With Agent |
|---|---|---|
| 2-Chloro-4-amino-6-(3'5'-dihydroxy-phenoxy-s-triazine | 21 | 33 |
| 2-Chloro-4-amino-6-m-hydroxy-phenoxy-s-triazine | 21 | 39 |
| 2-Chloro-4-amino-6-o-hydroxy-anilino-s-triazine | 24 | 35 |
| 2-Chloro-4-amino-6-m-hydroxy-anilino-s-triazine | 24 | 31 |
| 2-Chloro-4-amino-6-p-hydroxy-anilino-s-triazine | 35 | 38 |
| 2-Chloro-4-allylamino-6-m-hydroxyphenoxy-s-triazine | 24 | 30 |
| 2-Amino-4,6-bis(m-hydroxy-phenoxy)-s-triazine | 29 | 32 |
| 2-Hydroxy-4,6-bis(m-hydroxy-phenoxy)-s-triazine | 29 | 37 |

The 2-chloro-4-amino-6-o-hydroxyanilino-s-triazine and the corresponding m- and p-hydroxy compounds used above were prepared by the general procedures described in Example 1 using similar molar proportions of reagents. These compounds were white powders of indefinite melting point and analysed respectively for nitrogen 29.2% and chlorine 14.8%, nitrogen 29.6% and chlorine 16.2%, and nitrogen 26.5% and chlorine 13.2%. ($C_9H_8ClN_5O$ requires nitrogen 29.5% and chlorine 14.9%.

What we claim is:

1. A method of bonding rubber to copper or alloys thereof which comprises
   (a) adding to a vulcanisable rubber composition a triazine compound of the formula

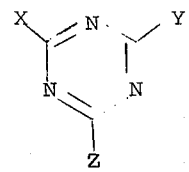

wherein X is a 3-hydroxyphenoxy, 3,4-dihydroxyphenoxy, or a 3,5-dihydroxyphenoxy group; Y is a chlorine atom, and Z is an amino group; and
   b. bringing the vulcanisable rubber composition into contact with the copper or alloy thereof, and thereafter heating the composite article to vulcanise the rubber.

2. A method as claimed in claim 1 wherein the copper is brass-coated steel cord.

3. A method of bonding a rubber to copper or alloys thereof which comprises
   a. adding to the vulcanisable rubber composition a triazine compound of the formula

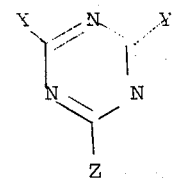

wherein X is a 3-hydroxyphenoxy, 3,4-dihydroxyphenoxy, 2-hydroxyphenoxy, 4-hydroxyphenoxy, 2,3-dihydroxyphenoxy or a 3-5-dihydroxyphenoxy group; Y is a chlorine atom, and Z is an amino group; and
   b. bringing the vulcanisable rubber composition into contact with the copper or alloy thereof, and thereafter heating the composite article to vulcanise the rubber.

* * * * *